(12) United States Patent
Kim (10) Patent No.: US 7,062,531 B2
(45) Date of Patent: Jun. 13, 2006

(54) METHOD FOR GENERATING HOUSE CODE IN HOME NETWORK

(75) Inventor: Seung-Cheon Kim, Anyang (KR)

(73) Assignee: LG Electronics, Inc., Seoul (KR)

( * ) Notice: Subject to any disclaimer, the term of this patent is extended or adjusted under 35 U.S.C. 154(b) by 342 days.

(21) Appl. No.: 10/289,423

(22) Filed: Nov. 7, 2002

(65) Prior Publication Data

US 2003/0088703 A1 May 8, 2003

(30) Foreign Application Priority Data

Nov. 7, 2001 (KR) .............................. 2001-69238

(51) Int. Cl.
*G06F 15/16* (2006.01)
(52) U.S. Cl. ...................................... 709/203; 709/221
(58) Field of Classification Search ................ 709/208, 709/223, 246–248, 227, 220, 212, 221, 206, 709/218, 219, 245; 370/494, 441, 395; 455/414, 455/5, 433; 715/513; 725/81, 98; 385/16; 705/1, 14

See application file for complete search history.

(56) References Cited

U.S. PATENT DOCUMENTS

| | | | | |
|---|---|---|---|---|
| 4,860,379 A | * | 8/1989 | Schoeneberger et al. ..... 725/24 |
| 5,017,141 A | * | 5/1991 | Relf et al. ..................... 434/29 |
| 5,778,116 A | * | 7/1998 | Tomich ........................ 385/16 |
| 5,793,759 A | * | 8/1998 | Rakib et al. ................ 370/342 |
| 5,835,718 A | * | 11/1998 | Blewett ...................... 709/218 |
| 5,852,722 A | * | 12/1998 | Hamilton .................... 709/221 |
| 5,991,308 A | * | 11/1999 | Fuhrmann et al. ..... 370/395.53 |
| 6,069,899 A | * | 5/2000 | Foley .......................... 370/494 |
| 6,073,176 A | * | 6/2000 | Baindur et al. ............. 709/227 |
| 6,097,942 A | * | 8/2000 | Laiho ....................... 455/414.1 |
| 6,175,860 B1 | * | 1/2001 | Gaucher ..................... 709/208 |
| 6,182,094 B1 | * | 1/2001 | Humpleman et al. ....... 715/513 |
| 6,356,555 B1 | * | 3/2002 | Rakib et al. ................. 370/441 |
| 6,397,058 B1 | * | 5/2002 | Thibert et al. ........... 455/414.1 |
| 6,480,889 B1 | * | 11/2002 | Saito et al. ................. 709/223 |
| 6,539,433 B1 | * | 3/2003 | Tominaga et al. .......... 709/246 |
| 6,643,511 B1 | * | 11/2003 | Rune et al. ................. 455/433 |
| 6,697,874 B1 | * | 2/2004 | Friden et al. ............... 709/240 |
| 6,701,381 B1 | * | 3/2004 | Hearne et al. .............. 719/313 |
| 6,711,400 B1 | * | 3/2004 | Aura .......................... 455/411 |
| 6,735,619 B1 | * | 5/2004 | Sawada ...................... 709/212 |
| 6,950,879 B1 | * | 9/2005 | Zhou .......................... 709/245 |
| 2002/0052754 A1 | * | 5/2002 | Joyce et al. ................... 705/1 |
| 2002/0056128 A1 | * | 5/2002 | Makipaa ..................... 725/98 |

(Continued)

OTHER PUBLICATIONS

Home Networking Tutorial broadband.earthlink.net/home-networking/hardware/2wire/doc...re_home_net_tutorial.html.*

(Continued)

*Primary Examiner*—Thong Vu
(74) *Attorney, Agent, or Firm*—Birch, Stewart, Kolasch & Birch, LLP (57) ABSTRACT

Disclosed is a method for generating a house code (HC) in a home network based on a living network control protocol (LnCP), in which a (HC) having a small capacity is generated by using a region separation code and a household separation code and the generated HC is provided to each household. To this end, in the home network generating a HC for dividing each household and providing the generated HC to each household, the method comprises the steps of: generating a portion of the HC as a region separation code for dividing plural regions; and generating another portion of the HC as a household separation code for separating households in each of the plural regions.

7 Claims, 4 Drawing Sheets

U.S. PATENT DOCUMENTS

2002/0138578 A1* 9/2002 Zhou .................... 709/206
2003/0009537 A1* 1/2003 Wang .................... 709/219

OTHER PUBLICATIONS

Design and Implementation of Home Network System using Home Network Control Protocol; icat2.snu.ac.kr/ilab/paper/dist_file/152ISPLC58.pdf.*

LG :: Home Network & Mobile Network;www.lge.com/about/rnd/html/rndarea_home.jsp—63k.*

LG :: Overview; www.lge.com/products/homenetwork/html/overview.jsp—101k—Nov. 30, 2004.*

Distributed Computing: Moving from CGI to COBRA—James Fitzgibbon Targetnet (2000) www.usenix.org/publications/library/proceedings/usenix2000/general/full_papers/fitzgibbon/fitzgibbon.pdf.*

MESSENGERS User's Manual—Msgr- Version ; www.ics.uci.edu/~messengr/doc/manual/msgr01.ps.*

True Anonymity Without Mixes—Carlos Molina—Jimenez And (2001) www.cs.ncl.ac.uk/research/pubs/inproceedings/../inproceedings/papers/266.pdf.*

An End-to-End Approach to Host Mobility—Snoeren, Balakrishnan (2000) ◻◻◻nms.lcs.mit.edu/papers/e2emobility.ps.*

Handoffs in Cellular Wireless Networks: The Daedalus..—Srinivasan Seshan (1996) ◻◻◻◻daedalus.cs.berkeley.edu/publications/kluwer.ps.gz.*

Protocols for Adaptive Wireless and Mobile Networking—Johnson, Maltz (1996) ◻◻◻◻www.monarch.cs.cmu.edu/monarch-papers/pcs-monarch.ps.*

Roaming between satellite and terrestrial networks Shave, N.P.; 3G Mobile Communication Technologies, 2002. Third International Conference on (Conf. Publ. No. 489) May 8-10, 2002 pp.:58-63.*

Interconnection agreements between competing Internet service providers Dewan, R.; Freimer, M.; Gundepudi, P.; System Sciences, 2000. Proceedings of the 33rd Annual Hawaii International Conference on Jan. 4-7, 2000 p.:10 pp. vol. 1.*

Internet measurements and data study over the regional Cano, M-D.; Malgosa-Sanahuja, J.; Cerdan, F.; Garcia-Haro, J.;Communications, Computers and signal Processing, 2001. PACRIM. 2001 IEEE Pacific Rim Conference on vol. 2, Aug. 26-28, 2001 p.:393.*

* cited by examiner

| REGION R1<br>000 | REGION R2<br>001 | REGION R3<br>010 | REGION R10<br>110 | REGION R17<br>001 |
|---|---|---|---|---|
| REGION R4<br>011 | REGION R5<br>111 | REGION R6<br>100 | REGION R11<br>000<br>111 | REGION R18<br>001<br>110<br>100 |
| REGION R7<br>101 | REGION R8<br>110 | REGION R9<br>000 | REGION R12<br>001 | REGION R19<br>111<br>000 |
| REGION 13<br>011 | REGION R14<br>111 | REGION R15<br>000<br>111<br>110<br>100 | REGION R16<br>101 | REGION R20<br>100 |
| REGION R21<br>100 | REGION R22<br>100<br>011 | REGION R23<br>101<br>010 | REGION R24<br>111 | REGION R25<br>110 |

METHOD FOR GENERATING HOUSE CODE IN HOME NETWORK

This nonprovisional application claims priority under 35 U.S.C. § 119(a) on Patent Application No. 2001-0069238 filed in Korea on Nov. 7, 2001, which is herein incorporated by reference.

BACKGROUND OF THE INVENTION

1. Field of the Invention

The present invention relates to a home network based on a living network control protocol (LnCP), and particularly, to a method for generating a house code (HC) provided to each household to divide the households in a home network.

2. Description of the Background Art

A home network based on a living network control protocol (LnCP) and using power line communication (PLC) connects various kinds of digital domestic appliances such as a digital television, a refrigerator, an air conditioner, a washing machine, an electronic microwave, etc. to one another through a power line which suer through a power line which su digital domestic appliances control each operation by transmitting predetermined data through the power line.

Figure 1:
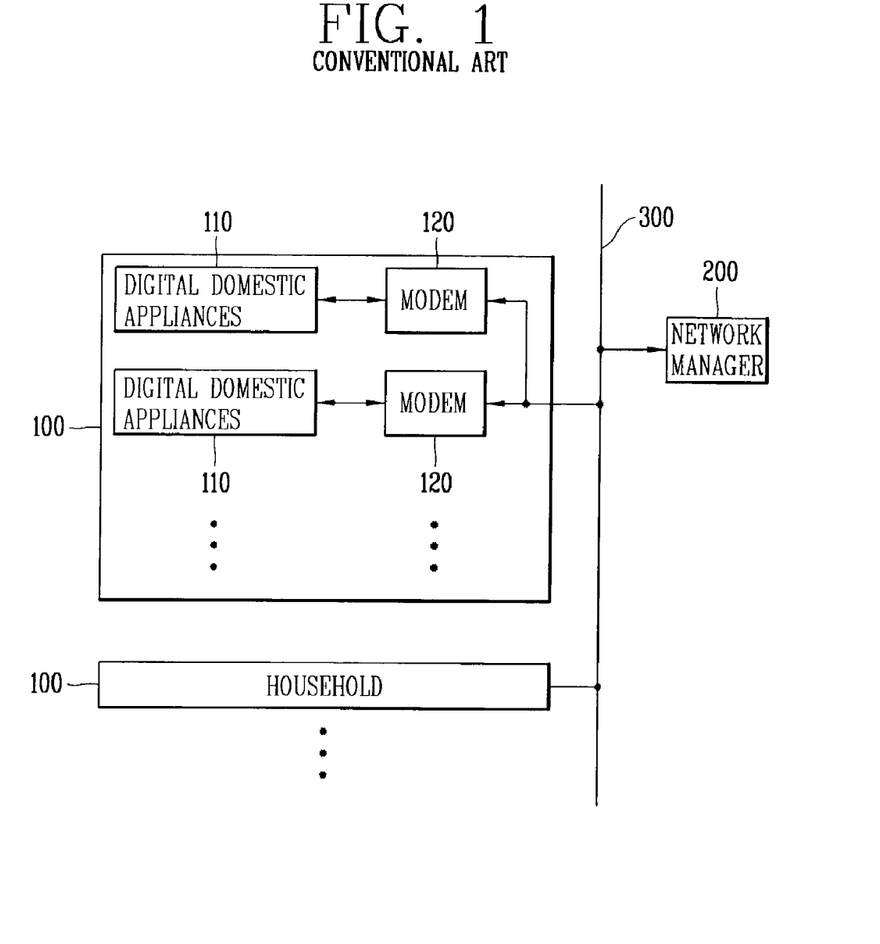
FIG. 1 is a schematic view showing a construction of a home network based on LnCP according to a background art.

FIG. 1 is a schematic view showing a construction of the home network based on LnCP.

As shown in FIG. 1, the home network comprises: various digital domestic appliances 110 that each household 100 uses such as a digital television, a refrigerator, an air conditioner, a washing machine, an electronic microwave, etc.; a modem 120 connected to the plurality of digital domestic appliances 110 and having a preset HC for relaying data communication of the plurality of digital domestic appliances 110 by using the preset HC. A reference numeral 200 denotes a network manager installed at a management center, and a reference numeral 300 denotes a power line for supplying electricity to various kinds of electronic appliances including the plurality of digital domestic appliances 100.

In the modem 120 of the respective household 100, a same HC is preset and stored, and a different house codes is provided to each household 100.

The network manager 200 and the modem 120 are connected to each other through the power line 300, the network manager 200 and the digital domestic appliances 110 perform data communication by the PLC through the power line 300 and the modem 120, and the digital domestic appliances 110 perform data communication one another through the modem 120 and the power line 300.

For example, in case that the network manager 200 transmits a data to a digital domestic appliance 110 installed at a household 100, the home network constructs a data frame in advance. The data frame will be explained with reference to FIG. 2.

Figure 2:
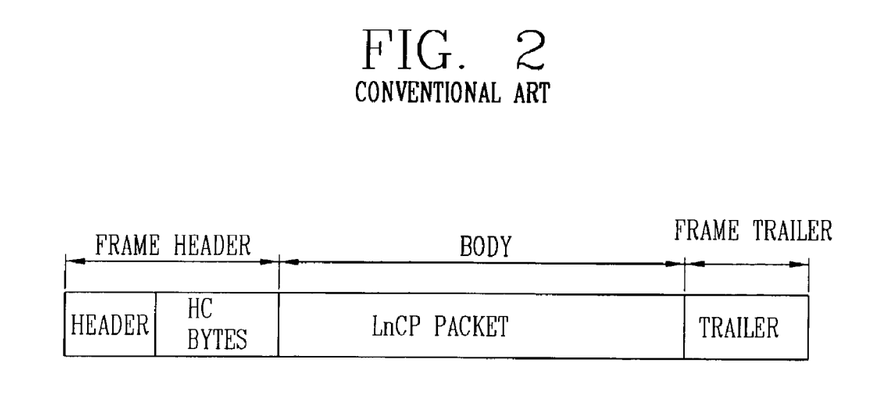
FIG. 2 is an example showing a data frame form of a PLC medium.

FIG. 2 is an example showing a data frame form of a PLC medium.

As shown in FIG. 2, the data frame includes a frame header composed of a header and a HC; a body having operation orders of the digital domestic appliances 110 and composed of a LnCP packet; a number of total bits; and a frame trailer composed of a cyclic redundancy checking (CRC) code and a code indicating an end of a frame.

If the data frame is constructed, the network manager 200 transmits the constructed data frame through the power line 300 by the PLC, and the transmitted data frame is received by the modem 120 connected to the digital domestic appliances 110 of each household 100.

The modem 120 which received the data frame extracts a HC from the frame header of the data frame and determines whether the extracted HC is consistent with a HC preset to itself or not. As a result of the determination, if so, the modem 120 transmits the received data frame to the digital domestic appliance 110 connected to itself. The digital domestic appliance 110 extracts the LnCP packet of the body from the received data frame and determines whether a predetermined order is given to itself or not. If the order is given to itself, the digital domestic appliance performs operations by the predetermined order, and if the order is not given to itself, the digital domestic appliance ignores the order.

In the meantime, in case that a predetermined data which will be transmitted to the network manager 200 by the digital domestic appliance 110 exists, the data is transmitted to the modem 120 and the modem 120 constructs a frame data with a predetermined data inputted from the digital domestic appliance 110 and the preset HC. The constructed frame data is transmitted to the network manager 200 through the power line 300.

Also, the digital domestic appliances 110 in each household 110 can control mutual operations by transmitting predetermined data one another. For example, a user can control operations of a boiler, an electronic microwave, a washing machine, etc., which are far away from a digital television with watching the digital television.

In the home network which controls operations of the digital domestic appliances 110 by transmitting predetermined data one another by the PLC on the basis of the LnCP, the HC is provided to each household 100 with a capacity of 4 bytes as a unique value for the households 100. The HC is designated for the households 100, stored at a header portion of all transmitted lower medium access control (MAC) frame, and continuously used.

However, the conventional HC is not necessary in sending and receiving data which control operations of the digital domestic appliances 110, and as the capacity of the HC increases, the thoughtput of the data decreases.

Also, to apply the HC to nations such as China where many households exist and the number of the households increases rapidly, the capacity of the HC has to be increased and the HC has to be changed later. That is, even if the HC is provided to each household with the capacity of 4 bytes currently, the capacity of the HC has the possibility of increasing to 6 to 8 bytes in accordance with the increase in the households. If the capacity of the HC becomes 6 to 8 bytes, a part corresponding to 5~10% of a transmittance frame is consumed by the HC having no relation with operation data of the digital domestic appliances 110.

SUMMARY OF THE INVENTION

Therefore, an object of the present invention is to provide a method for generating a house code (HC) in a home network, in which a HC having a small capacity (e.g., 2 bytes and not 4 bytes) is provided to a plurality of households without increasing the number of bytes of the HC even if the households are increased limitlessly.

Another object of the present invention is to provide a method for generating a HC in a home network based on a LnCP, in which the HC is provided not as a unique value but as a value having a possibility of overlapping between regions, thereby decreasing a capacity of the HC and providing the HC to all households without extending even if the HC is worldwide used in accordance with the HC normalized.

To achieve these and other advantages and in accordance with the purpose of the present invention, as embodied and broadly described herein, there is provided a method for generating a house code in a home network generating a HC for dividing each household and providing the generated HC to each household, the method comprising the steps of: generating one portion of the HC as a region separation code for separating plural regions; and generating another portion of the HC as a household separation code for separating households in each of the plural regions.

To achieve these and other advantages and in accordance with the purpose of the present invention, as embodied and broadly described herein, there is also provided a method for generating a house code in a home network generating a HC for dividing each household and providing the generated HC to each household, the method comprising the steps of: dividing regions to which the HC will be provided; setting a basic region among the divided plural regions and providing the basic region with a region separation code of the HC; determining an order of divided regions to which the region separation codes of the HC will be provided on the basis of the set basic region; selecting the divided regions one by one by the determined order and providing a region adjacent to the selected region with a region separation code not consistent with already provided region separation codes; and when the one region separation code is provided, providing the respective divided regions with household separation codes of the HC not consistent with one another.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

With reference to FIGS. 3 to 6, it will be explained a method for generating a house code in a home network, in which a HC having a small capacity is provided to a plurality of households without increasing the number of bytes of the HC even if the number of households is increased limitlessly, by generating one portion of the HC as a region separation code for separating plural regions and by generating another portion of the HC as a household separation code for providing to each household of the plural regions.

Figure 3:
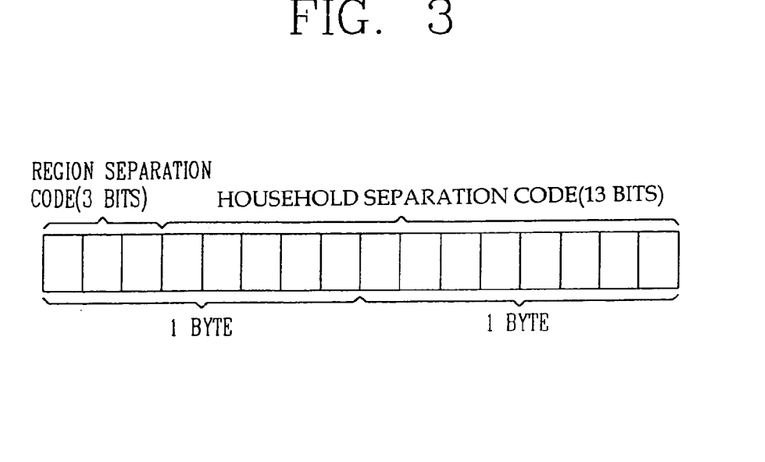
FIG. 3 is a view to explain a method for generating a region separation code and a household separation code at a house code according to the present invention.

FIG. 3 is an example of a HC to explain a method for generating a region separation code and a household separation code in a house code according to an embodiment of the present invention.

As shown in FIG. 3, the HC is set as entire 2 bytes. The upper 3 bits among the HC of 2 bytes are set as a region separation code area for storing a region separation code, and the lower 13 bits are set as a household separation code area for storing a household separation code to separate households in each region. In the present invention, the capacity of the HC can be set more than 2 bytes.

According to an embodiment, a reason why the region separation code is set as 3 bits is because 8 ($2^3=8$) different region separation codes are possible and in case that regions are divided into squares and the region separation codes are provided to the divided respective regions, a great number of region separation codes enough to provide adjacent regions with different region separation codes can be obtained.

If region separation codes corresponding to the respective regions are generated, possible household separation codes provided to the household are 8,192 ($2^{13}$), and the household separation codes can be provided to entire households living in one region.

Hereinafter, a method for providing each household with the HC of 2 bytes having the region separation code and the household separation code will be explained with reference to FIG. 4.

Figure 4:
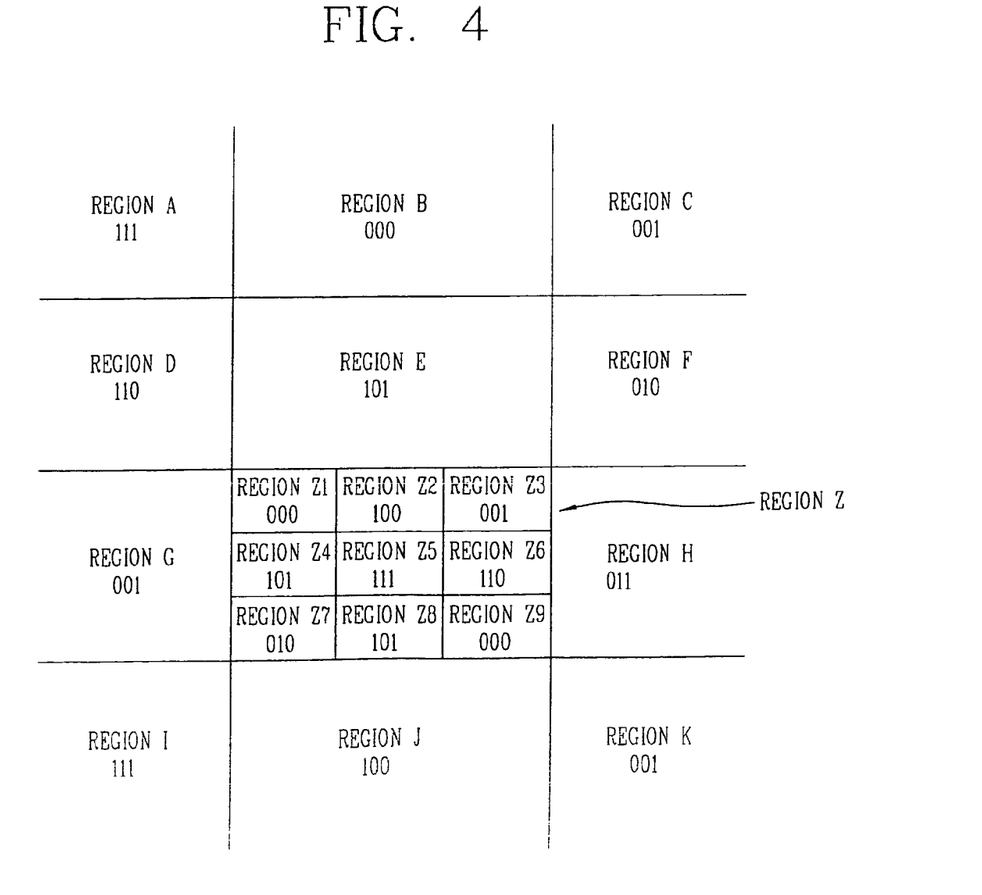
FIG. 4 is an example showing a method for providing households in the divided regions with a HC having the region separation code and the household separation code according to the present invention.

FIG. 4 is an example for explaining a method for providing households in the divided regions with a HC having a region separation code and a household separation code according to the present invention.

First, the HC is not selected arbitrarily by each household. If one's home network is registered to a central management center through the Internet or a telephone, a certification server (not shown) of the central management center generates a HC for that household and the generated HC is provided to that household. Accordingly, the certification server separates the region separation codes differently according to each region, and provides each household in the divided regions with a HC having a region separation code and a household separation code together on the basis of the different region separation codes. At this time, a unique HC value provided to each household can be increased in accordance with the increase in the number of households.

As shown in FIG. 4, in the present invention, all households to which the HCs will be provided are divided according to the region, and different region separation codes are provided to adjacent regions.

For example, in case that a region separation code of '111' is provided to a region A, the code 111 is not provided to regions B(000), D(110), and E(101) adjacent to the region A, but is provided to a region I far away from the region A. That is, even if the region A and the region I use the same region separation code, a physical interference between the home networks in these two regions is not generated since the region A and the region I are far away from each other. In this manner, the region separation codes are distributed to all the regions and a unique household separation code is provided to each household in each region, thereby generating a HC having no interference among the households.

Also, for a region Z where households are dense, the region Z is further divided into regions Z1~Z9, and region separation codes (000, 100, 001, 101, 111, 110, 010, 101 and 000) different from those of adjacent regions D~K are appropriately assigned and provided to the divided regions Z1~Z9, thereby effectively providing many house codes to the region Z.

The certification server has to distribute region separation codes effectively by defining a region having dense households such as the region Z and by allocating the region separation codes appropriately.

Accordingly, in the present invention, as shown in FIG. 4, the region separation codes and household separation codes can be supported just with 2 bytes, and in case that a capacity of the HC is increased, the HC can be provided to more households.

Hereinafter, a method for generating a house code according to the present invention will be explained with reference to FIG. 5.

Figure 5:
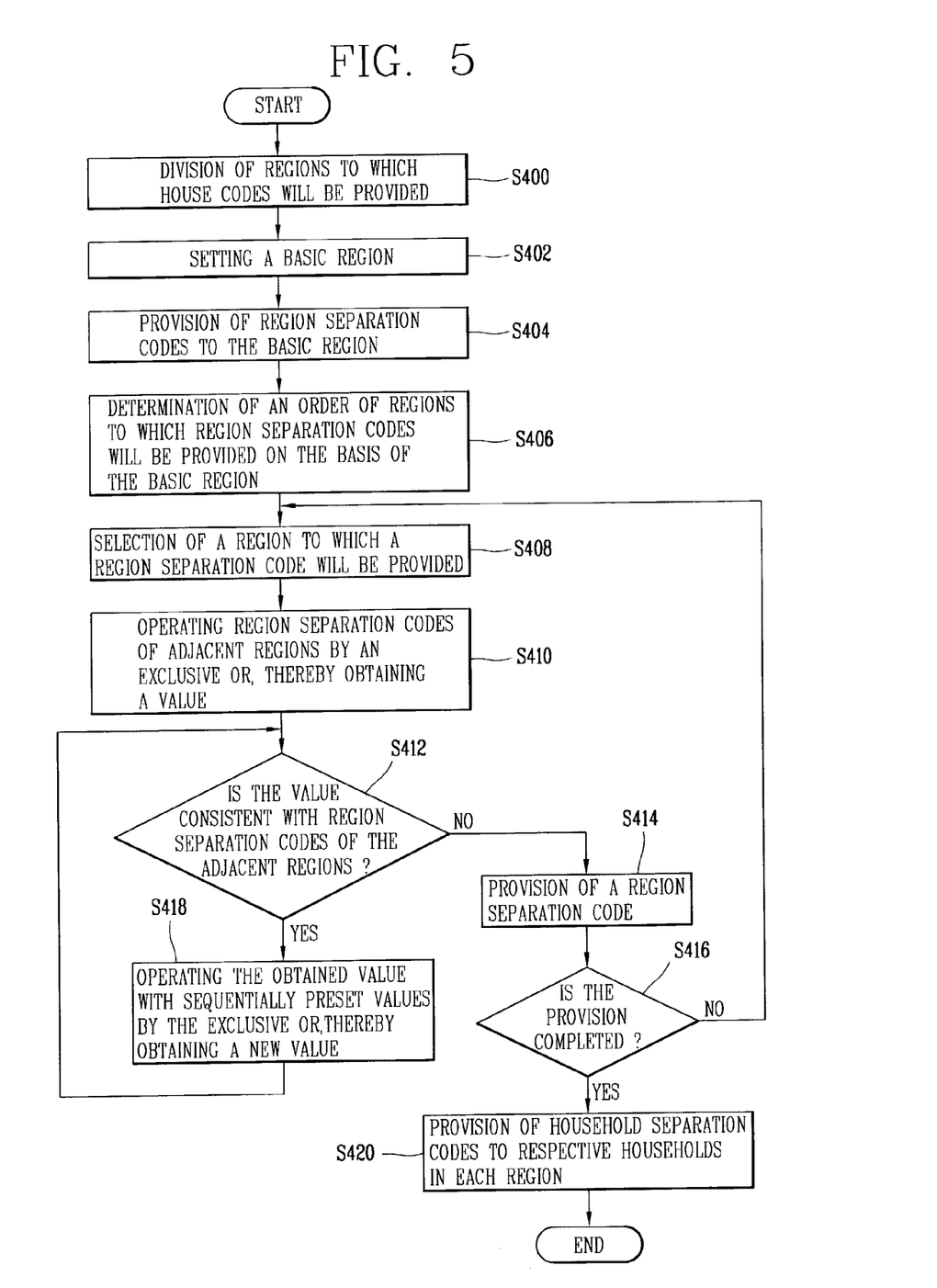
FIG. 5 is a flow chart showing a method for generating a HC according to the present invention.

FIG. 5 is a flow chart showing a method for generating a HC according to the present invention.

As shown in FIG. 5, the certification server divides regions to which the HC will be provided.

Figure 6:
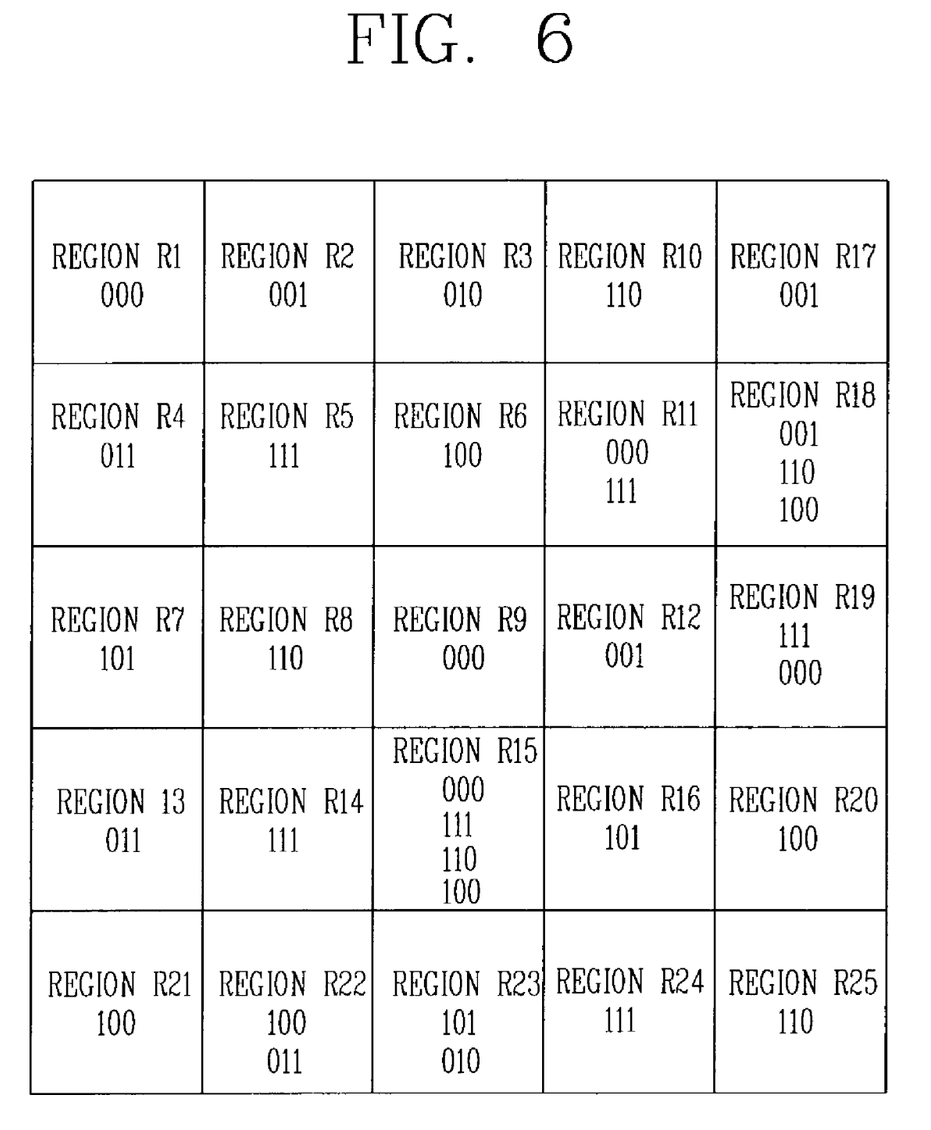
FIG. 6 is a view to explain operations for providing region separation codes according to the present invention.

FIG. 6 is an example of a region division and a region separation code assignment to explain an operation for providing region separation codes according to the present invention.

Referring to FIGS. 5 and 6, regions to which the HC will be provided are divided into R1~R25 (S400).

Subsequently, the certification server sets a special region among the regions R1~R25 as a basic region. For example, as shown in FIG. 6, the divided regions R1~R9 adjacent one another are set as basic regions (S402).

If the basic regions are set, the certification server provides each basic region with a predetermined region separation code. For example, if the divided regions R1~R9 are set as basic regions, region separation codes 000, 001, 010, 011, 111, 100, 101, 110, and 000 are assigned and provided to the regions R1~R9 respectively so as not to be overlapped with one another (S404).

If it is completed that the region separation codes are provided to the set basic regions, the certification server determines an order of divided regions (regions outside the basic regions) to which the region separation codes will be provided on the basis of the basic regions. For example, as shown in FIG. 6, an order by which the region separation codes will be provided is determined, in which divided regions R10~R12 located right of the regions R1~R9 is the first, divided regions R13~R15 located below the regions R1~R9 is the second, and a divided region R16 located diagonally with the regions R1~R9 is the third. Then, an order by which the region separation codes will be provided is determined, in which divided regions R17~R20 located right of the regions R1~R9 is the first, divided regions R21~R24 located below the regions R1~R9 is the second, and a divided region R25 located diagonally with the regions R1~R9 is the third.

The order by which the region separation codes are provided can be determined by setting one divided region as a basic region first and then by determining an order of other divided regions to which the region separation codes will be provided by a clockwise direction or a counterclockwise direction on the basis of the basic region (S406).

If the order to provide the region separation codes is determined, the certification server selects one divided region to which a region separation code will be provided by the determined order (S408), and an operation of 'exclusive OR' is performed for divided regions adjacent to the selected one region. For example, divided regions adjacent to the selected one divided region R10 are R3, R6, R11, R17, and R18. At this time, the exclusive OR operation is performed for the divided regions R3 and R6 to which region separation codes are provided except the divided regions R11, R17, and R18 to which region separation codes are not provided (S410).

Subsequently, it is determined whether or not a value obtained by the exclusive OR operation is consistent with (same as) region separation codes already provided to the adjacent divided regions. If the value is not consistent with the region separation codes already provided to the adjacent divided regions, the value (region separation code) is provided to the divided region. For example, a value 110 obtained by the exclusive OR operation for the divided regions R3 and R6 is provided to the divided region R10 as a region separation code (S412, S414).

If the region separation codes are provided in the step S414, the certification server determines whether a provision of the region separation codes is completed or not for all the divided regions (S416). If the provision is not completed, the region separation codes are provided to next divided regions by returning to the step S408, which is repeated.

In the meantime, if a value obtained by the exclusive OR operation is consistent with the region separation codes already provided to the adjacent divided regions, the certification server obtains a new value by operating the first value by the exclusive OR with a sequentially preset value (S418), and then determines whether the new value is consistent with region separation codes already provided to the adjacent divided regions in the step S412 or not, which is repeated as needed. At this time, if the new value is not consistent with region separation codes already provided to the adjacent divided regions, the new value is provided to the divided region as a region separation code (S414), and it is determined whether a provision of the region separation codes is completed or not, which is repeated as needed (S416).

For example, in case that a region separation code ('000') is initially provided to the divided region R11, the region separation codes provided to the divided regions R3, R6, R9, R10 among the adjacent regions R3, R6, R9, R10, R12, R17, R18, and R19 are obtained by the exclusive OR operation, thereby obtaining a value '000'. At this time, since the obtained value 000 is consistent with the region separation code 000 provided to the divided region R9, the 000 is operated by the exclusive OR with a sequentially preset value. The sequentially preset values are 111, 001, 010, 100, 101, and 110. That is, the obtained value 000 is operated by the exclusive OR with the first preset value 111 among these sequentially preset values, thereby obtaining 111. Since the 111 is not consistent with region separation codes provided to the adjacent divided regions R3, R6, R9, and R10, the 111 is provided to the divided region R11 as a region separation code.

Also, as another example, in case that a region separation code ('000') is initially provided to the divided region R15, the region separation codes of the divided regions R8, R9, R12, and R14 are operated by the exclusive OR, thereby obtaining 000. Since the 000 is consistent with the region separation code provided to the divided region R9, the 000 is operated by the exclusive OR with the first sequentially preset value 111 among all the sequentially preset values, thereby obtaining 111. At this time, since the obtained 111 is consistent with the region separation code ('111') provided to the divided region R14, the 000 is again operated by the exclusive OR with the second preset value 001 among the sequentially preset values, thereby obtaining 110. Herein, since the 110 is also consistent with the region separation code ('110') provided to the divided region R8, 110 is again operated by the exclusive OR with the third preset value 010 among the sequentially preset values, thereby obtaining 100. The 100 is not consistent with region separation codes provided to the adjacent divided regions R8, R9, R12, and R14. Thus, 100 is assigned and provided to the divided region R15 as a region separation code.

The certification server provides the plural divided regions with all region separation codes which are not overlapped in adjacent regions. If it is determined that a provision of the region separation codes is completed in the step S416, household separation codes of the remaining 13 bits are assigned and provided to households in the divided regions as unique values not consistent with one another (S420). That is, a household separation code is assigned and provided to each household in each region. The provided region separation code and the household separation code are added to constitute one HC.

Accordingly, users for digital domestic appliances of the respective households obtain own unique house codes by connecting to the certification server through, e.g., a telephone to a center management center or Internet. The obtained house codes are stored to a modem respectively connected to the digital domestic appliances, thereby controlling operations of the digital domestic appliances through PLC on the basis of the LnCP.

Although a method for setting the HC as 2 bytes, providing 3 bits among the 2 bytes as a region separation code, and providing the remaining 13 bits as a household separation code is explained above, the present invention is not limited to this method and covers other variations and examples. For example, in the present invention, it is possible to modify the method into various methods in which the number of the bytes of the HC and the number of the bits of the region separation code and the household separation code can be increased or decreased if necessary. Also, in setting the region separation code, a preset region separation code is operated by the exclusive OR with the sequentially preset values and if the obtained value is not consistent with region separation codes provided to the adjacent divided regions, the obtained value is provided as a region separation code. However, in the present invention, a region separation code can be obtained by another method besides the exclusive OR operation.

Also, the HC having a small capacity can effectively divide a large number of households in township, dong, and ri which divide an administrative district.

As aforementioned, in the present invention, so as to provide the HC to each household in a home network based on LnCP, an area is divided into plural regions, adjacent divided regions among the plural divided regions are provided different region separation codes, and household separation codes are provided to the divided region in unique values, thereby decreasing a capacity of the HC. That is, whereas the capacity of the HC was 4 bytes in the conventional art, in the present invention, the capacity of the HC is 2 bytes, resulting in providing HCs to much more households than the conventional art using less number of bytes.

Also, in the present invention, a transmission efficiency of data can be increased by decreasing the capacity of the HC.

Also, in the present invention, even if the number of the households is increased, the HC is provided to all households by dividing regions without increasing the capacity of the HC, thereby solving a problem of expandability.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for generating a house code (HC) in a home network, the method comprising the steps of:
    generating one portion of the HC as a region separation code for separating plural regions; and
    generating another portion of the HC as a household separation code for identifying each household of the plural regions, wherein the step of generating the region separation code includes the steps of:
    dividing regions to which HCs will be provided;
    setting a basic region from the divided regions and providing at least one region separation code of the HCs to the basic region;
    determining an order of other divided regions to which the region separation codes of the HCs will be provided on the basis of the set basic region; and
    selecting the other divided regions one by one by the determined order and providing a region adjacent to the selected region with a region separation code not consistent with already provided region separation codes, and
    wherein the step of providing a region separation code not consistent with already provided region separation codes includes the steps of:
    operating region separation codes of the divided regions having the region separation codes among the divided regions adjacent to the selected one divided region by an exclusive OR; and then
    providing a value obtained from the exclusive OR to a region adjacent to the selected region as a region separation code.

2. The method of claim 1, further comprising the steps of:
    determining whether or not the value obtained by the exclusive OR is consistent with region separation codes already provided to adjacent divided regions; and
    providing a new value not consistent with the region separation codes already provided to the adjacent divided regions.

3. The method of claim 2, wherein the step of providing the new values includes:
    operating the value obtained by the exclusive OR with sequentially preset values consecutively by the exclusive OR in case that the determining step determines that the values obtained by the exclusive OR is consistent with the region separation codes already provided to the adjacent divided regions.

4. A method for generating a house code (HC) in a home network, the method comprising the steps of:

dividing regions to which HCs will be provided;

setting a basic region among the divided regions and providing at least one region separation code of the HCs to the basic region;

determining an order of other divided regions to which the region separation codes of the HCs will be provided on the basis of the set basic region;

selecting the other divided regions one by one by the determined order and providing one region separation code of the HC not consistent with already provided region separation codes to a region adjacent to the selected region; and providing a household separation code of the HC not consistent with already provided household separation codes to each household in the divided regions when the region separation codes are provided, the household separation code identifying a household, wherein some regions not adjacent to each other have a same separation code so a number of separation codes used to separate the divided regions is less than a number of the divided regions.

5. The method of claim 4, wherein the step of providing the region separation code of the HC includes the steps of:

setting regions adjacent one another among the divided regions as basic regions; and providing the basic regions with the region separation codes with the adjacent basic regions having different region separation codes.

6. A method for generating a house code (HC) in a home network, the method comprising the steps of:

dividing regions to which HCs will be provided;

setting a basic region among the divided regions and providing at least one region separation code of the HCs to the basic region;

determining an order of other divided regions to which the region separation codes of the HCs will be provided on the basis of the set basic region;

selecting the other divided regions one by one by the determined order and providing one region separation code of the HC not consistent with already provided region separation codes to a region adjacent to the selected region; and providing a household separation code of the HC not consistent with already provided household separation codes to each household in the divided regions when the region separation codes are provided, the household separation code identifying a household, wherein the step of providing the region separation code includes the steps of:

operating region separation codes of the divided regions having the region separation codes among the divided regions adjacent to the selected one divided region by an exclusive OR; and then providing a value obtained from the exclusive OR to a region adjacent to the selected region as a region separation code.

7. The method of claim 6, further comprising the steps of:

determining whether or not the value obtained by the exclusive OR is consistent with region separation codes already provided to adjacent divided regions; and providing a new value not consistent with the region separation codes already provided to the adjacent divided regions.

* * * * *